United States Patent
Svensson et al.

(10) Patent No.: US 10,912,317 B2
(45) Date of Patent: Feb. 9, 2021

(54) THERMAL PROCESSING APPARATUS

(71) Applicant: John Bean Technologies AB, Helsingborg (SE)

(72) Inventors: Leif Teddy Svensson, Marieholm (SE); Lars Johan Siljeborn, Dalby (SE)

(73) Assignee: John Bean Technologies AB, Helsingborg (SE)

( * ) Notice: Subject to any disclaimer, the term of this patent is extended or adjusted under 35 U.S.C. 154(b) by 124 days.

(21) Appl. No.: 16/165,353

(22) Filed: Oct. 19, 2018

(65) Prior Publication Data

US 2020/0120957 A1 Apr. 23, 2020

(51) Int. Cl.
*F27B 9/16* (2006.01)
*A23L 3/18* (2006.01)
(Continued)

(52) U.S. Cl.
CPC .............. *A23L 3/185* (2013.01); *A23L 3/001* (2013.01); *B65G 21/18* (2013.01); *B65G 33/02* (2013.01);
(Continued)

(58) Field of Classification Search
CPC ........ A47J 37/046; A47J 37/045; A47J 27/00; F27B 9/16; F27B 9/243; A21B 1/46; F27D 15/0266; F27D 2003/0063
See application file for complete search history.

(56) References Cited

U.S. PATENT DOCUMENTS 4,444,248 A 4/1984 Hirosuke
4,953,365 A 9/1990 Lang et al.
(Continued)

FOREIGN PATENT DOCUMENTS

EP 0 923 868 A1 6/1999
EP 0 870 430 B1 5/2000
(Continued)

OTHER PUBLICATIONS

Search Report and Written Opinion dated Aug. 19, 2020, issued in corresponding Dutch Patent Application No. NL 1043432, filed Oct. 18, 2019, 11 pages.

*Primary Examiner* — Gregory A Wilson
(74) *Attorney, Agent, or Firm* — Christensen O'Connor Johnson Kindness PLLC

(57) ABSTRACT

A conveyor belt (36) is arranged in at least one spiral conveyor unit (32) or (34) is arranged in tiers forming at ascending spiral stack (38) and/or a descending spiral stack (40). A ceiling or top sheet (58) is positioned over the spiral stack. A circulation fan (60, 62) draws spent thermal processing medium laterally from the tiers of the spiral stack, up the exterior of the stack and across the top of the stack above the ceiling or top sheet and through a heat exchanger (64) located above the ceiling. The treated thermal processing medium is then routed across the remainder of the diameter of the spiral stack and then down the side of the spiral stack diametrically opposite to the circulating fan thereby to enter the spiral stack in a lateral direction diametrically toward the circulating fan. At least one opening (70, 100, 200) is formed in the ceiling between the heat exchanger and the diametrically distal end of the spiral stack from the circulating fan thereby to provide an alternative flow path for a portion of the thermal processing medium to enter the spiral stack from above, thereby resulting in more uniform treatment of the work product being carried by the conveyor of the spiral stack.

19 Claims, 13 Drawing Sheets

(51) Int. Cl.
*A23L 3/00* (2006.01)
*B65G 21/18* (2006.01)
*B65G 33/02* (2006.01)
*B65G 49/00* (2006.01)
*B65G 33/24* (2006.01)

(52) U.S. Cl.
CPC .............. *B65G 33/24* (2013.01); *B65G 49/00* (2013.01); *B65G 2201/0202* (2013.01); *B65G 2207/24* (2013.01); *B65G 2812/99* (2013.01)

(56) References Cited

U.S. PATENT DOCUMENTS

| | | | |
|---|---|---|---|
| 5,078,120 | A | 1/1992 | Hwang |
| 5,329,916 | A * | 7/1994 | Lygum .................... A21B 1/48 |
| | | | 126/20.1 |
| 6,095,805 | A | 8/2000 | Kuenen |
| 6,142,066 | A | 11/2000 | Anders et al. |
| 6,144,168 | A | 11/2000 | Kern |
| 6,494,131 | B2 | 12/2002 | van de Vorost et al. |
| 6,707,010 | B2 | 3/2004 | Kuenen |
| 8,415,592 | B2 | 4/2013 | Kuenen |
| 8,567,308 | B2 | 10/2013 | Onozato et al. |
| 8,646,383 | B1 | 2/2014 | Howard |
| 8,753,703 | B2 * | 6/2014 | Gunawardena ........... A23L 5/17 |
| | | | 198/778 |
| 9,021,944 | B2 | 5/2015 | Leferink et al. |
| 9,044,022 | B2 | 6/2015 | van der Eerden et al. |
| 9,107,422 | B2 | 8/2015 | Howard et al. |
| 9,161,651 | B2 * | 10/2015 | Ros .......................... A21B 1/48 |
| 9,220,276 | B2 | 12/2015 | Howard |
| 9,372,000 | B2 | 6/2016 | Ploof et al. |
| 9,504,258 | B1 | 11/2016 | Howard et al. |
| 9,510,610 | B2 | 12/2016 | Howard |
| 9,668,613 | B2 | 6/2017 | Ahmed |
| 9,700,059 | B2 * | 7/2017 | van der Eerden ........ A21B 1/40 |
| 10,448,650 | B2 * | 10/2019 | van de Rijt ............ A47J 37/044 |
| 2006/0185525 | A1 | 8/2006 | Uenen |
| 2011/0084056 | A1 | 4/2011 | Uenen |
| 2011/0226137 | A1 * | 9/2011 | van der Eerden ........ A21B 1/48 |
| | | | 99/477 |
| 2011/0247355 | A1 | 10/2011 | McCormick et al. |
| 2015/0245643 | A1 | 9/2015 | Kop et al. |
| 2015/0342227 | A1 | 12/2015 | Verbruggen et al. |
| 2016/0324194 | A1 | 11/2016 | Ohrlander |

FOREIGN PATENT DOCUMENTS

| | | |
|---|---|---|
| EP | 0 953 286 B1 | 7/2005 |
| EP | 2 110 020 A1 | 10/2009 |
| EP | 2 143 669 A1 | 1/2010 |
| EP | 1 221 575 B2 | 9/2010 |
| EP | 2 740 361 A2 | 6/2014 |
| EP | 2 135 509 B1 | 9/2015 |
| EP | 2 987 410 A1 | 2/2016 |
| GB | 2 328 602 A | 3/1999 |
| JP | S4996344 A | 9/1974 |
| JP | H08200922 A | 8/1996 |
| WO | 2017/85064 A1 | 5/2017 |

* cited by examiner

THERMAL PROCESSING APPARATUS

BACKGROUND

Spiral conveyor-based thermal processing systems include heating surface or a cooling/freezing surface in the form of a pervious conveyor belt for conveying work pieces, including food, through a thermal processing chamber in a spiral or helical path. If the work piece is being cooked or otherwise heated, the heat source, such as steam, heated air or mixtures thereof, is provided within or adjacent the cooking chamber for heating the work pieces. Correspondingly, if thermal processing is in the form of cooling or freezing, then the source of cooling medium is provided either within the cooling/freezing chamber or adjacent thereto.

An advantage of thermal processing systems utilizing spiral conveyor belts is that a relatively long processing path may be achieved with a small footprint. For example, a 600-foot-long thermal processing conveyor belt in a spiral configuration can be contained within about a 20-foot×20-foot×20-foot housing. However, spiral stack conveyor thermal processing systems do have some inherent drawbacks from a linear oven or freezer of a comparable length. In a linear oven or freezer, the upper and lower surfaces are exposed to being efficiently impinged upon by the thermal processing medium. However, in a spiral oven, the work products are not as directly accessible to the thermal processing medium since the work products are arranged in stacked layers, thus requiring a less direct thermal processing method than direct impingement of the thermal processing medium onto the work product.

In one spiral stack conveyor configuration, a fan system is used to direct the flow of thermal processing medium in the form of 100% steam or air or a mixture of steam and air horizontally across the layers of the spiral stack. A fan system is used to draw the processing medium across the stack and then typically up to a location above the spiral stack and through a heat exchanger to either heat or cool the treating medium. Once exiting the heat exchanger, the treated medium is directed to flow downwardly along an exterior portion of the stack diametrically opposite to the location of the circulating fans to draw the heating medium laterally into the spiral stack and then across the spiral stack.

As will be appreciated, this flow arrangement of the thermal treating medium may not achieve uniform treatment of all of the work products positioned across the width of the helically arranged conveyor. This is especially true for the work products located at the inside of the conveyor, especially since such work products become relatively closer together due to the circular configuration of the tiers of the conveyor stack. As such, the work products on the inside of the conveyor may tend to receive less processing medium per unit work product relative to the work products located along the outside of the conveyor. Various attempts have been made to address this situation, but typically without full success. The present disclosure provides thermal processing systems with spiral conveyors that add to the foregoing problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A thermal processing apparatus includes a powered conveyor belt for supporting work products during thermal processing, with the conveyor belt moving along a spiral path arranged as a tiered stack. A ceiling or top sheeting is positioned over the conveyor belt stack. A circulation system is used to collect gaseous thermal processing medium from the tiers of the spiral conveyor belt stack and direct such thermal processing medium along an upward path located outward of the tiered stack to an elevation above the top sheeting and then across the top sheeting and through a heat exchanger. Thereafter, the circulation system directs the thermal processing fluid in a downward path along the exterior of the tiered stack at a location diametrically across from the upward flow path of the thermal processing medium thereby to laterally enter the tiers of the tiered stack. At least one opening is formed in the top sheeting of a fixed sized and location positioned above the spiral path of the spiral conveyor belt thereby to provide a flow route for a portion of the thermal processing medium flowing across the top sheeting to instead downwardly enter the spiral path of the conveyor belt at a location across from the upward flow path of the thermal processing medium.

In a further aspect of the present disclosure, a plurality of openings of fixed size and location are formed in a top sheeting above the spiral path of the conveyor belt.

In accordance with a further aspect of the present disclosure, a portion of the top sheeting above the spiral path of the conveyor belt is removed to provide a portion of the thermal processing medium access to the spiral path of the conveyor belt stack.

In accordance with a further aspect of the present disclosure, an arcuate opening of fixed size is formed in the top sheeting above the spiral path of the conveyor belt.

In accordance with a further aspect of the present disclosure, a thermal processing medium flowing through the at least one opening in the top sheeting is in the range of about 10% to 50% of the total flow of the gaseous medium. More specifically, the percentage of the thermal processing medium flowing through the at least one opening in the top sheeting is in the range of about 20% to 50% of the total flow of the gaseous medium. More specifically, the percentage of the thermal processing medium flowing through the at least one opening in the top sheeting is in the range of about 30 to 50% of the total flow of the gaseous medium.

In accordance with a further aspect of the present disclosure, the thermal processing apparatus includes a housing and a conveyor belt arranged in two interconnecting spiral stacks positioned side by side within the housing. In each stack, the spiral conveyor belt defines a tiered annular travel path for the conveyor belt for supporting the work pieces during thermal processing. An upright partition wall is located between the two spiral stacks of the conveyor belt so as to enable different processing parameters or conditions to be applied to the two spiral stacks. A top sheeting or ceiling is positioned above the two spiral stacks of the conveyor belt. A circulation system is positioned in the housing with respect to each of the spiral stacks at locations spaced away from the partition wall to draw gaseous thermal processing medium from the tiers of the spiral stacks and direct the thermal processing medium upward to an elevation above the top sheeting and then across the top sheeting toward the central partition wall and then downwardly along a path exterior to the spiral stacks and adjacent the partition wall to cause the thermal processing medium to laterally enter the tiers of the spiral stacks. The top sheeting for each of the spiral conveyor stacks defines at least one opening of fixed size and location disposed above the spiral path of the spiral conveyor belt adjacent the partition wall to provide an alternative route for a portion of the thermal processing medium to downwardly enter the annular path of the spiral belt stacks.

In accordance with a further aspect of the present invention, the percentage of the total flow of thermal processing medium through the at least one opening in the top sheeting ranges from 10 to 50% of the total flow of thermal processing medium across the top sheeting. In accordance with a more specific embodiment of the present disclosure, the percentage of the total flow of thermal processing medium flowing through the at least one opening in the top sheeting is from 20 to 50% of the thermal processing medium flowing across the top sheeting. In accordance with a further aspect of the present disclosure, the percentage of the thermal processing medium flowing through the at least one opening in the top sheeting is from 30 to 50% of the thermal processing medium flowing across the top sheeting.

In accordance with a further aspect of the present disclosure, a plurality of openings of fixed size and locations are formed in the top sheeting of the two conveyor stacks at a location above the tiers of the spiral conveyor stacks.

In accordance with a further aspect of the present disclosure, a portion of the top sheeting adjacent a partition wall and above the spiral path of the spiral conveyor belt is removed to provide a portion of the thermal processing medium an access path to enter the spiral conveyor belt path from above the spiral stacks and thereby to thermally treat the work products being carried on the spiral conveyor belt.

In accordance with a further aspect of the present disclosure, an arcuate opening is formed in the top sheeting of a curvature corresponding to the curvature of the spiral conveyor belt positioned beneath the top sheeting.

In accordance with a further aspect of the present disclosure, a heat exchanger is positioned within the flow path of the thermal processing medium when exterior to the spiral conveyor stacks to add heat to or extract heat from the thermal processing medium.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
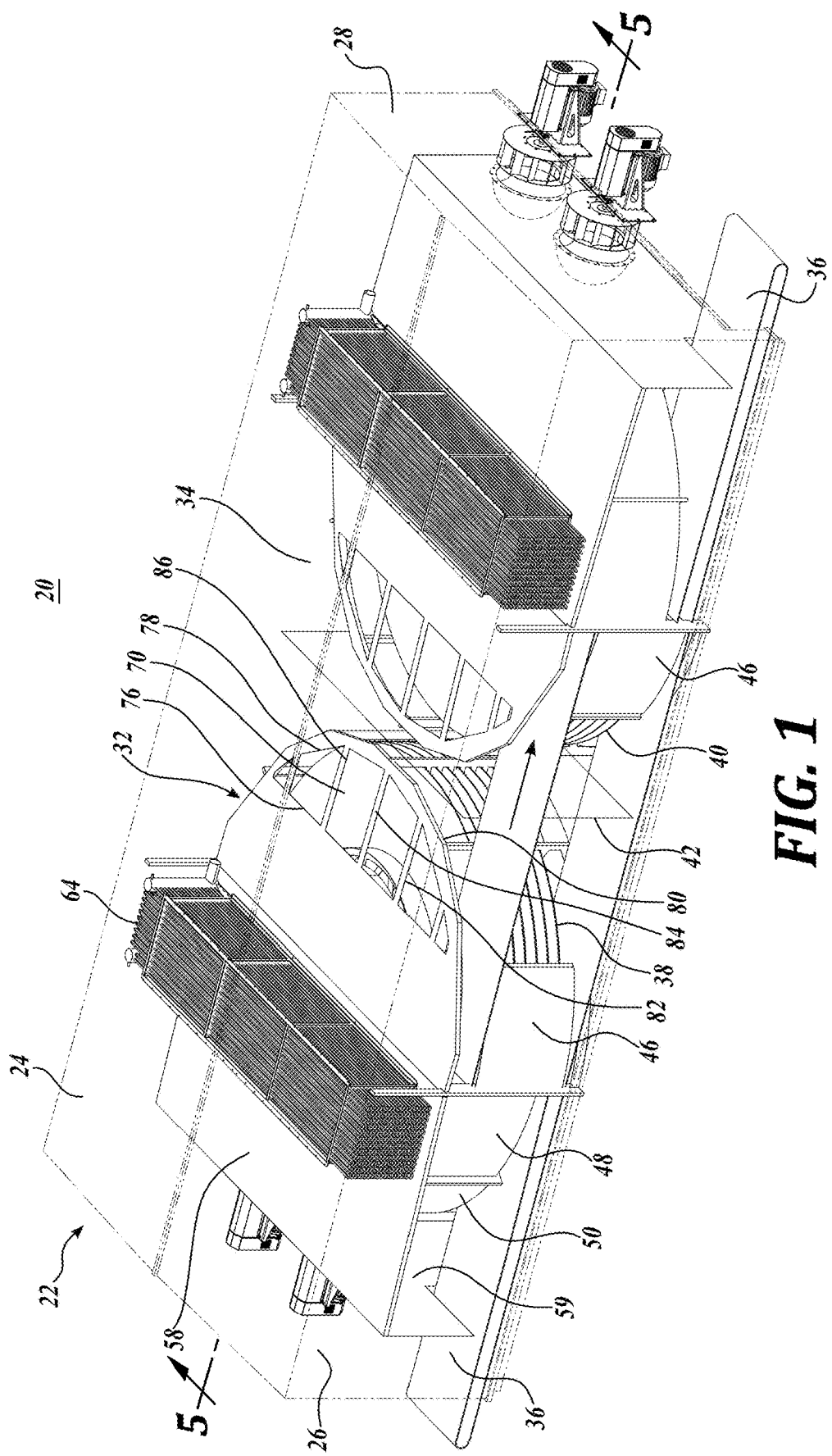
FIG. 1 is a pictorial view of the first embodiment of the present disclosure showing dual spiral conveyor stacks.
Figure 2:
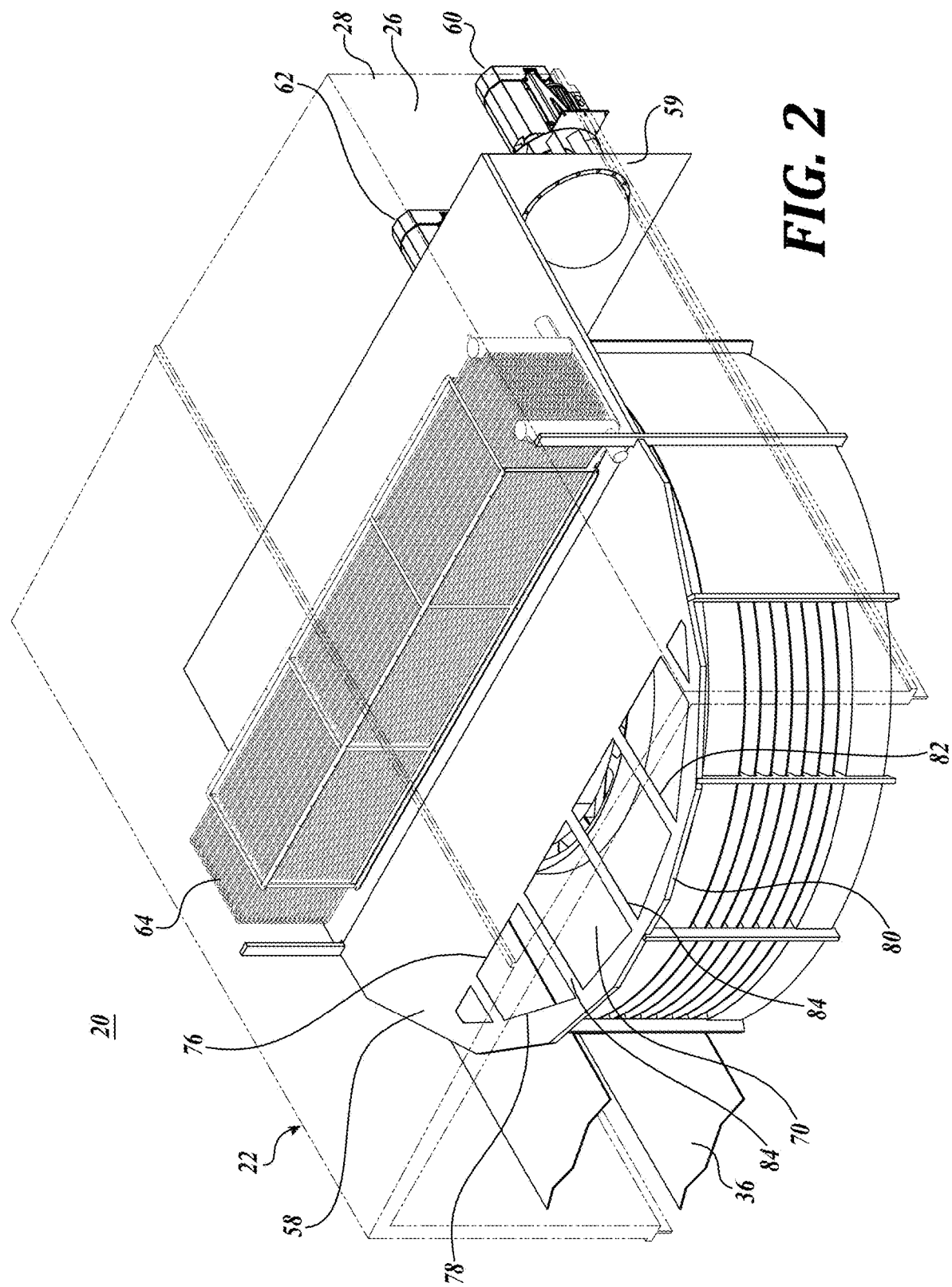
FIG. 2 is a pictorial view of a portion of FIG. 1 showing a single spiral conveyor stack.
Figure 3:
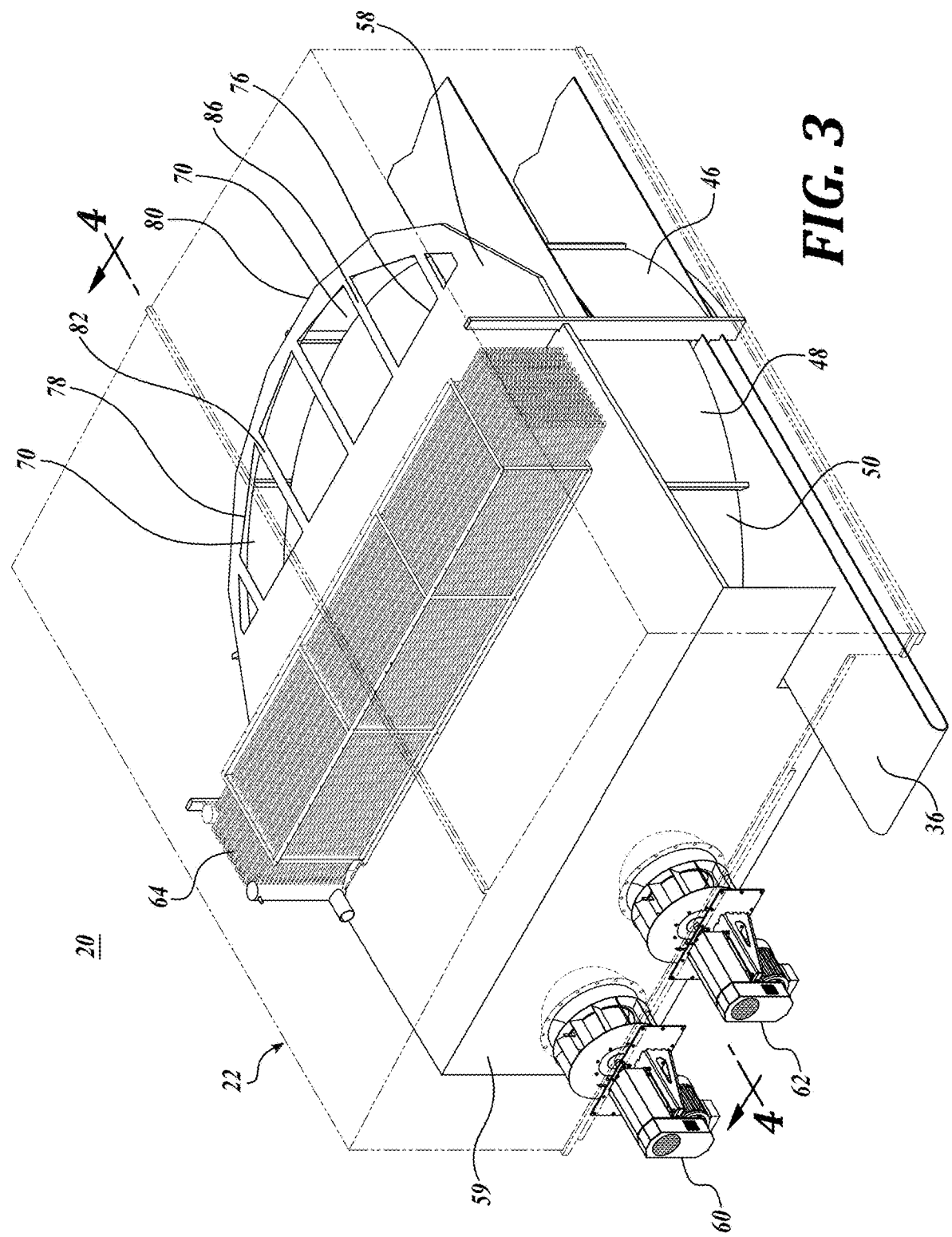
FIG. 3 is a view similar to FIG. 2 but taken from the opposite side of FIG. 2.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "work product or "workpiece" synonymously. One example of a work product or workpiece described in the present application is a food product, such as for example, beef, poultry, fish, vegetable, fruit, and nuts.

In the following description and in the accompanying drawings, corresponding or similar systems, assemblies, apparatus and units may be identified by the same part number, but with an alpha suffix or with a prime or double prime designation. The descriptions of the parts/components of such systems assemblies, apparatus, and units that are the same or similar are not repeated so as to avoid redundancy in the present application.

Referring initially to FIGS. 1-5, a first embodiment of a thermal processing apparatus 20 is illustrated as including a generally rectangularly shaped housing 22 having a top section 24, longitudinal side sections 26, and transverse end sections 28, as well as a floor 30. The housing 22 is sized to contain first and second spiral or helical conveyor unis 32 and 34. A continuous powered conveyor belt 36 is arranged in tiers forming an ascending spiral stack 38 in conveyor unit 32 and arranged in tiers forming a descending spiral stack 40 in conveyor unit 34. As shown in FIG. 1, the conveyor belt 36 enters the spiral conveyor unit 32 at the bottom thereof at an inlet and then travels in a spiral until reaching the top of the spiral stack 38 and then extends tangentially from stack 38 to the top stack 40 to descend along the spiral conveyor unit 34 to eventually exit the unit 34 from the bottom tier of the stack 40.

A center or mid wall 42 divides the two spiral conveyor units 32 and 34 into separate zones wherein different process media conditions can be employed. For example, the temperature of the air or other processing medium, the moisture in the air, etc., may be different in the two zones created by the mid or cross wall 42

The circumferences of the conveyor stacks 38 and 40 are partially enclosed by side panels including panels 46, 48 and 50 which are visible in the figures, as well as additional panels facing the ends 28 of the housing 22 which are not visible in the figures. However, the sections of the conveyor stacks 38 and 42 facing the cross wall 40 are substantially open for receiving the processing medium therein, as discussed below.

Figure 4:
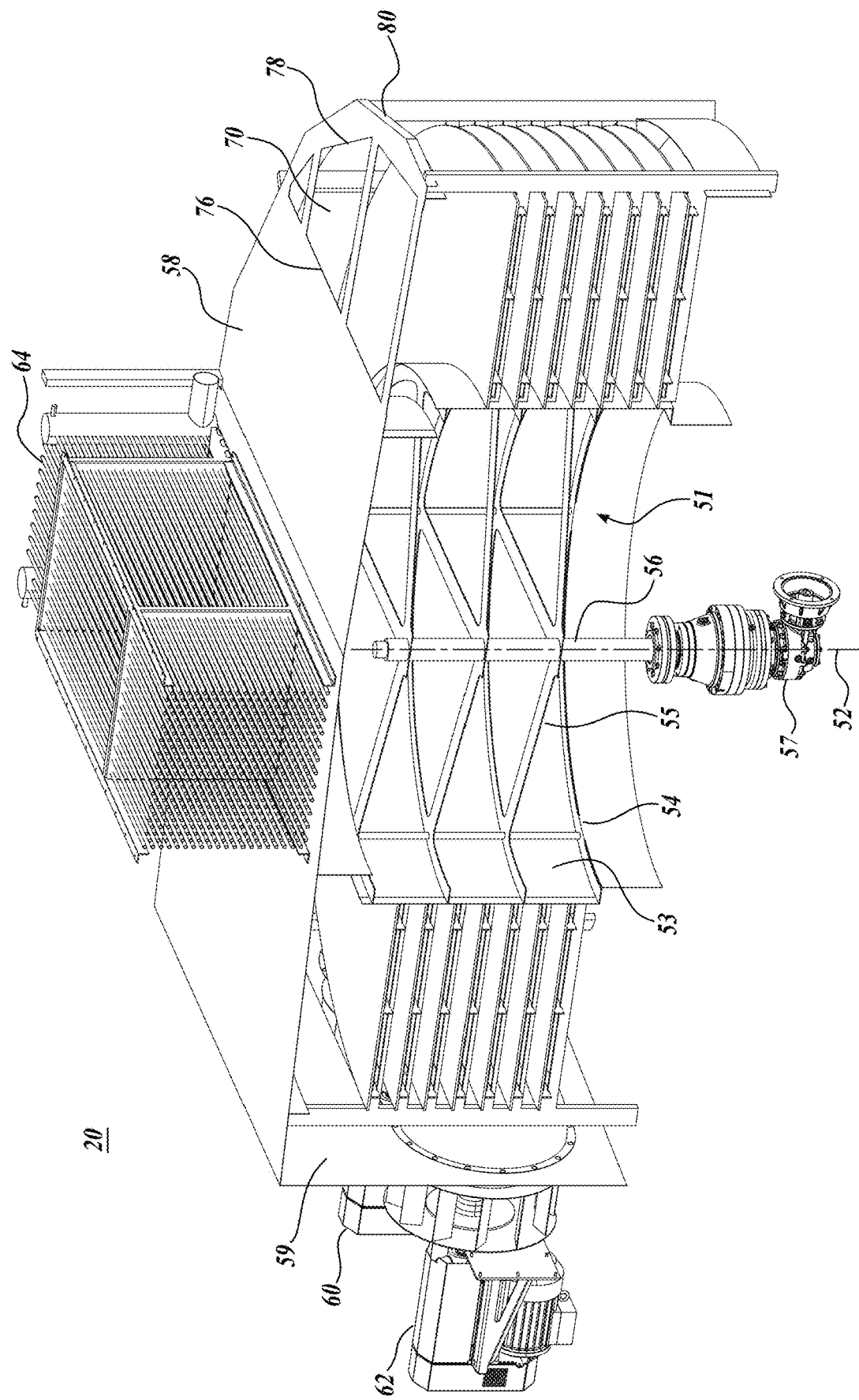
FIG. 4 is a pictorial cross-sectional view of FIG. 3 taken along lines 4-4 thereof.
Figure 5:
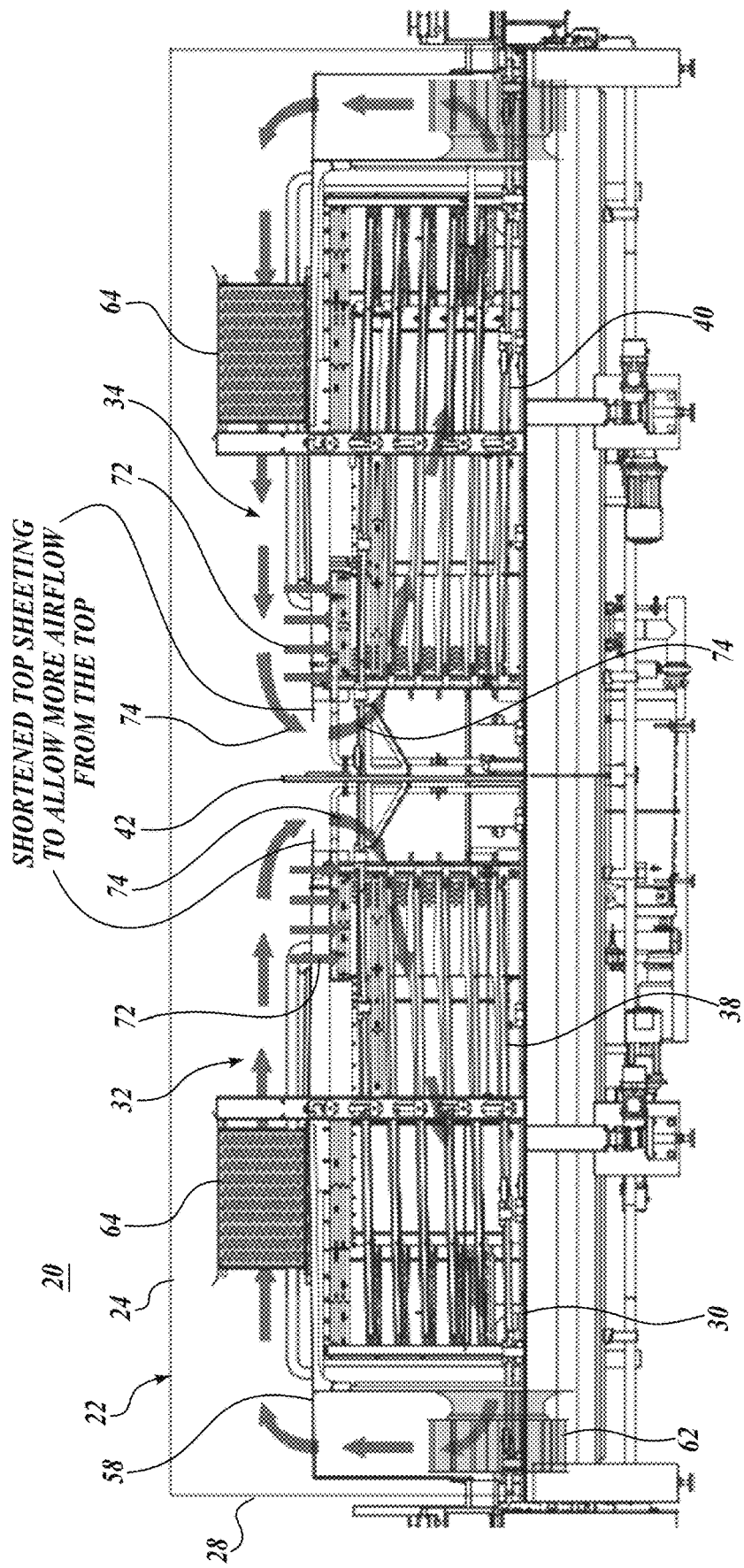
FIG. 5 is a schematic cross-section view of FIG. 1 taken along lines 5-5 thereof.
Figure 6:
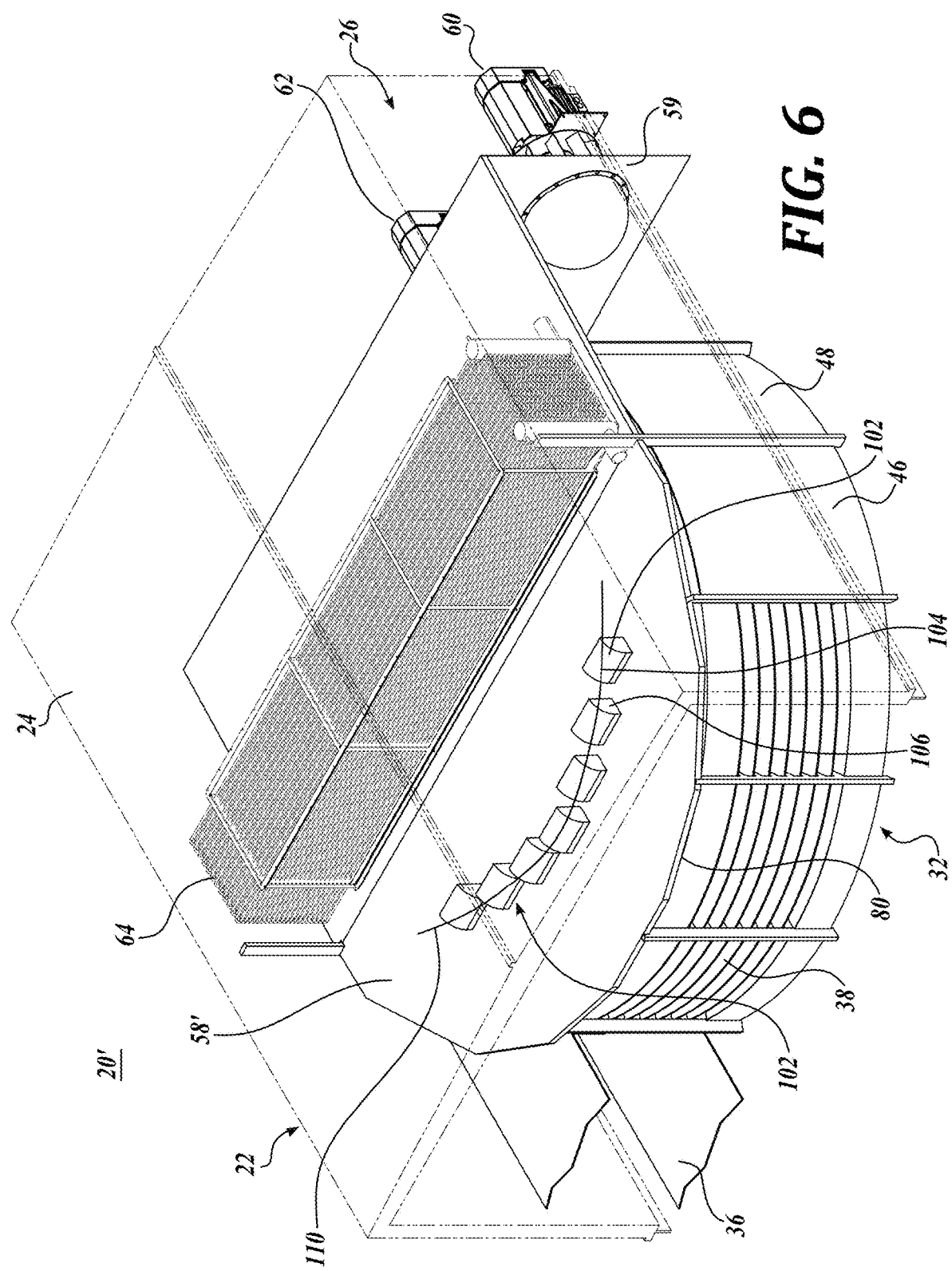
FIG. 6 is an isometric view of a further embodiment of the present disclosure.
Figure 7:
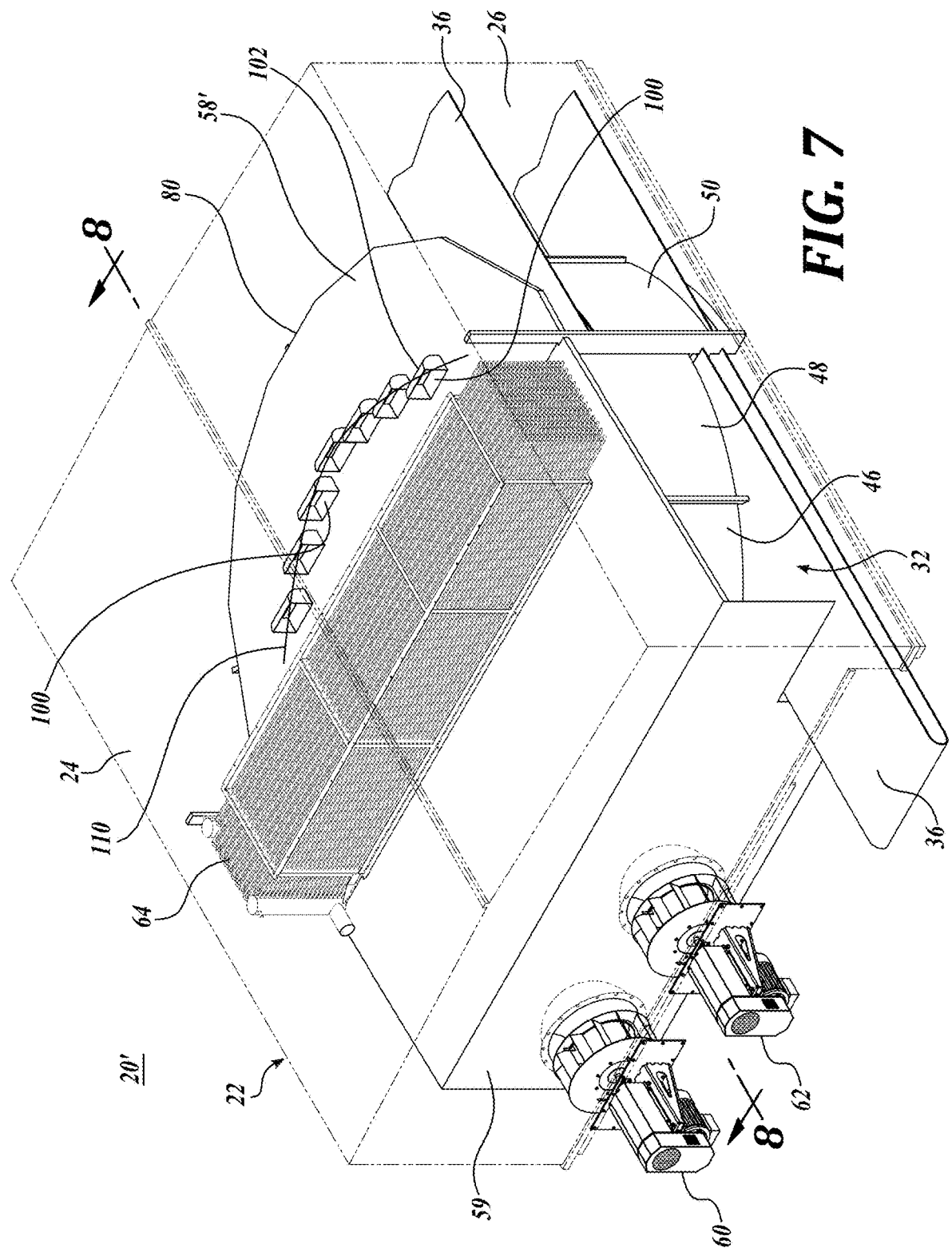
FIG. 7 is an isometric view of FIG. 6 taken from the opposite side thereof.

As best shown in FIG. 4, the center of the conveyor stacks 38 and 40 extend around a central drive system 51 that rotates the conveyor units 32 and 34 about a central axis 52. The drive system includes a cylindrical drive drum 53 that frictionally, rotationally drives conveyor belt 36 over supports 54 that are fixed in place, thereby to rotate the belt about axis 52. The belt 36 tightens around the drive drum 53 creating enough friction therebetween to drive the belt forward to slide over the supports 54. The drive drum 53 is carried by a frame structure 55 radiating outward from central vertical axle 56 that extend upwardly from a power unit 57 that rotates the axle 56 about axis 52.

A ceiling or top sheet structure 58 overlies a substantial portion of the conveyor stacks 38 and 40. The ceiling structure toward the mid wall 42 may be shaped to correspond to the circular shape of the conveyor stacks 38 and 40. However, from about the center of the conveyor stacks toward the housing end walls 28, the ceiling structure 58 may be generally rectangular in shape, and once past the circumference of the stacks 38 and 40, the ceiling structure extends downwardly to form a flange section 59.

Circulation fans 60 and 62 are positioned at outward sides of the conveyor units 32 and 34 to draw processing medium, for example, air, across the interior of the conveyor stacks 38 and 40 (around hub 53) so as to thermally treat the work products being carried on the conveyor belt 36 and then direct such processing medium upwardly along the end walls 28 of the housing 22 toward the top section 24 of the housing. Thereafter the processing medium is directed through a heat exchanger 64 extending transversely across the top of each of the stacks 38 and 40. The heat exchanger 64 may be mounted on or just above the ceiling 58 by an appropriate mounting structure.

The processing air or other medium being circulated by the fans 60 and 62 when passing through the heat exchanger 64 is either cooled or heated as desired. The heated or cooled processing medium then continues to flow over the ceiling 58 until reaching a segment shaped opening 70 formed in the inward section of the ceiling (adjacent the mid or cross wall 42). Some of the processing medium, represented by arrows 72, flows downwardly through the opening 70, see FIG. 5. The remainder of the processing medium continues to flow horizontally over the ceiling 58 until reaching the cross wall 42 wherein the processing medium is deflected downwardly to flow along the exposed adjacent portion of the conveyor stacks 38 and 40 and enter into the stacks in a lateral direction as depicted by arrows 74 in FIG. 5.

In a typical installation, the ceiling 58 would cover the entire top of the stacks 38 and 40 so that all the processing medium would be forced to flow over the top of the ceiling until reaching the cross wall 42 to then be directed downwardly and then laterally into the tiers of the stacks 38 and 40. However, for spiral conveyor systems that have relatively wide conveyor belts, it is difficult to achieve uniform processing of the work products that extend across the entire width of the conveyor belt 36. Applicant has discovered that providing opening(s) 70 in the portion of the ceiling 58 located adjacent or toward the mid wall 42 enables at least a portion of the processing medium to flow downwardly through the opening(s) and into the tiers of the spiral conveyor stacks. As a result, more uniform thermal processing of the work product across the entire width of the conveyor belt 36 is achieved.

As shown in FIGS. 1-4, the opening 70 in basic shape resembles a segment of a circle and defines a transverse margin or edge 76 extending across the ceiling 58 and an arcuate margin or edge 78 extending inwardly of and along the curved outer edge 80 of the ceiling 58. Cross ties 82, 84 and 86 span between the margins 76 and 78 of the ceiling to lend stiffness and structural integrity to ceiling 58.

The overall area defined by the opening 70 may be selected depending on various factors, such as the flow rate of the processing medium through the apparatus 20, the number of tiers comprising the conveyor stacks 38 and 40, the speed of operation of the conveyor belt 36, etc. In this regard, the area defined by the opening 70 may be from about 9% to about 36% of the total circular area defined by the conveyor stacks 38 and 40 when looking downwardly thereupon. Applicant has found that when the size of the opening 70 is 18% of the overall area of the conveyor stacks 38 and 40, the percent of the processing medium flowing downwardly through the opening 70 is about 50% of the overall flow the processing medium.

As a non-limiting example, the size of the opening 70 can be selected so that the percentage of the flow of the processing medium downwardly through the opening 70 may be set at from 10% to 50% of the overall flow. As a further example, the size of the opening 70 can be adjusted so that the flow of the processing fluid passing downwardly through the opening may be set at about 20% to 50% of the overall flow of the processing medium. As a further example, the size of the opening 70 can be set so that the percentage of the processing medium flowing downwardly through the opening 70 may be from about 30% to 50% of the overall flow of the processing medium.

FIGS. 6-9 disclose a further embodiment of the present disclosure. In these figures, those components or parts that are the same or essentially the same as shown in FIGS. 1-6 are identified by the same part numbers.

As shown in FIG. 6-9, the ceiling 58' essentially covers the entire top of the conveyor stacks 38 and 40. A series of openings 100 are formed in the ceiling 58' at locations between the heat exchanger 64 and the curved edge portion 80 of the ceiling 58'. Hoods 102 having curved top surfaces 104 positioned over each of the openings 100 so as to help deflect processing fluid passing from the heat exchanger 64 and directing such processing medium downwardly to the top of the conveyor stacks 38 and 40 located beneath the openings 100. The hoods have side walls 106 to help contain and direct the processing medium deflected by the hoods 102 downwardly to the spiral stacks 38 and 40 as depicted by arrows 108 in FIG. 9. The hoods 102 may be mounted on the ceiling 56' by any convenient means, such as by welding, riveting, bolting, etc.

The total area of the openings 100 constitute about 1% to about 4% of the overall circular area defined by the conveyor stacks 38 and 40. Due to the efficiency of the openings 100 and corresponding hoods 102 when the overall area of the openings is about 2% of the area of the stacks 38 and 40, the percentage of the processing air deflected downwardly through the openings is from about 11% of the overall flow of processing medium circulated in the apparatus 20' shown in FIGS. 6-9.

Figure 8:
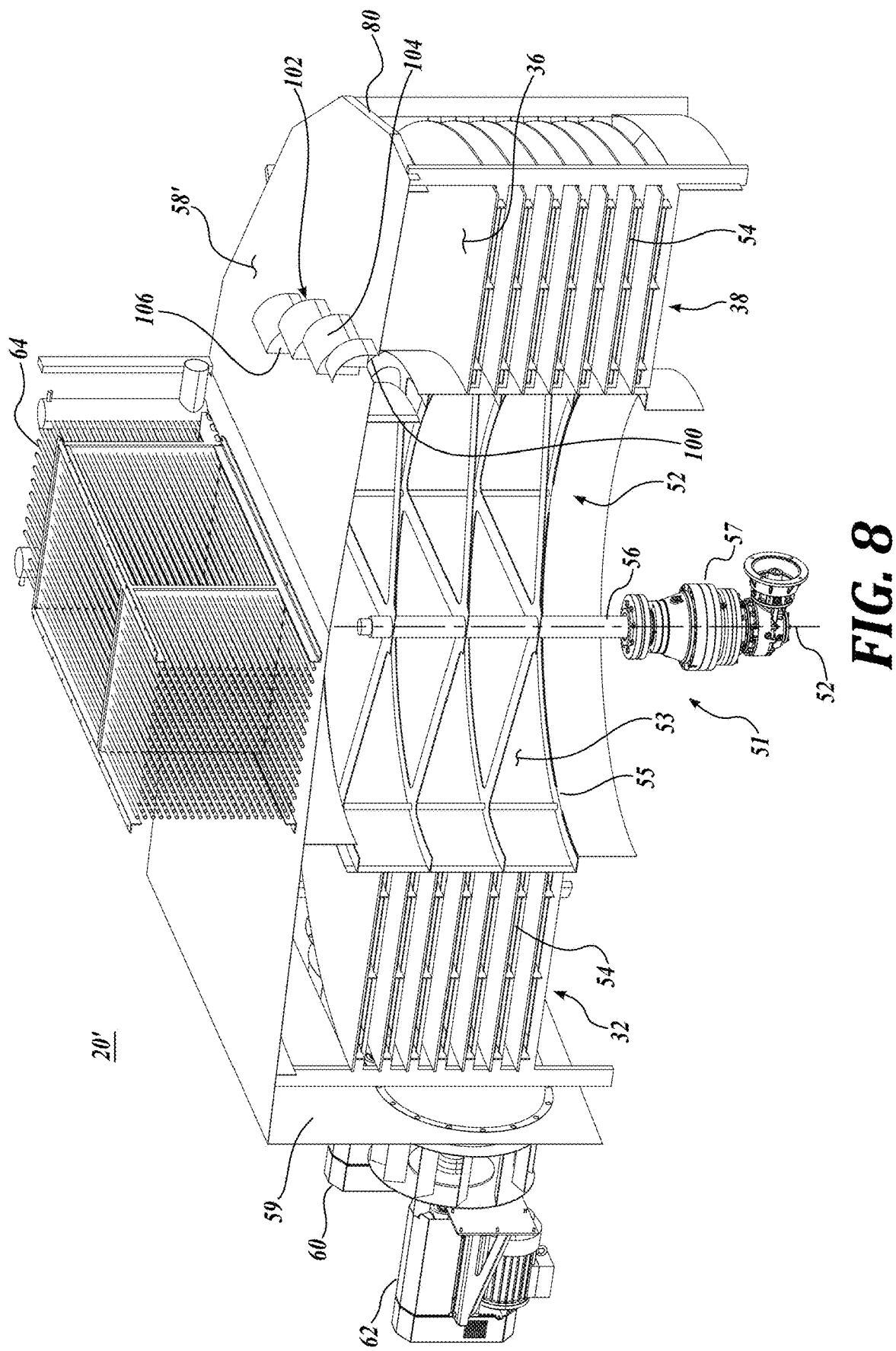
FIG. 8 is an isometric cross-sectional view of FIG. 7 taken along lines 8-8 thereof.
Figure 9:
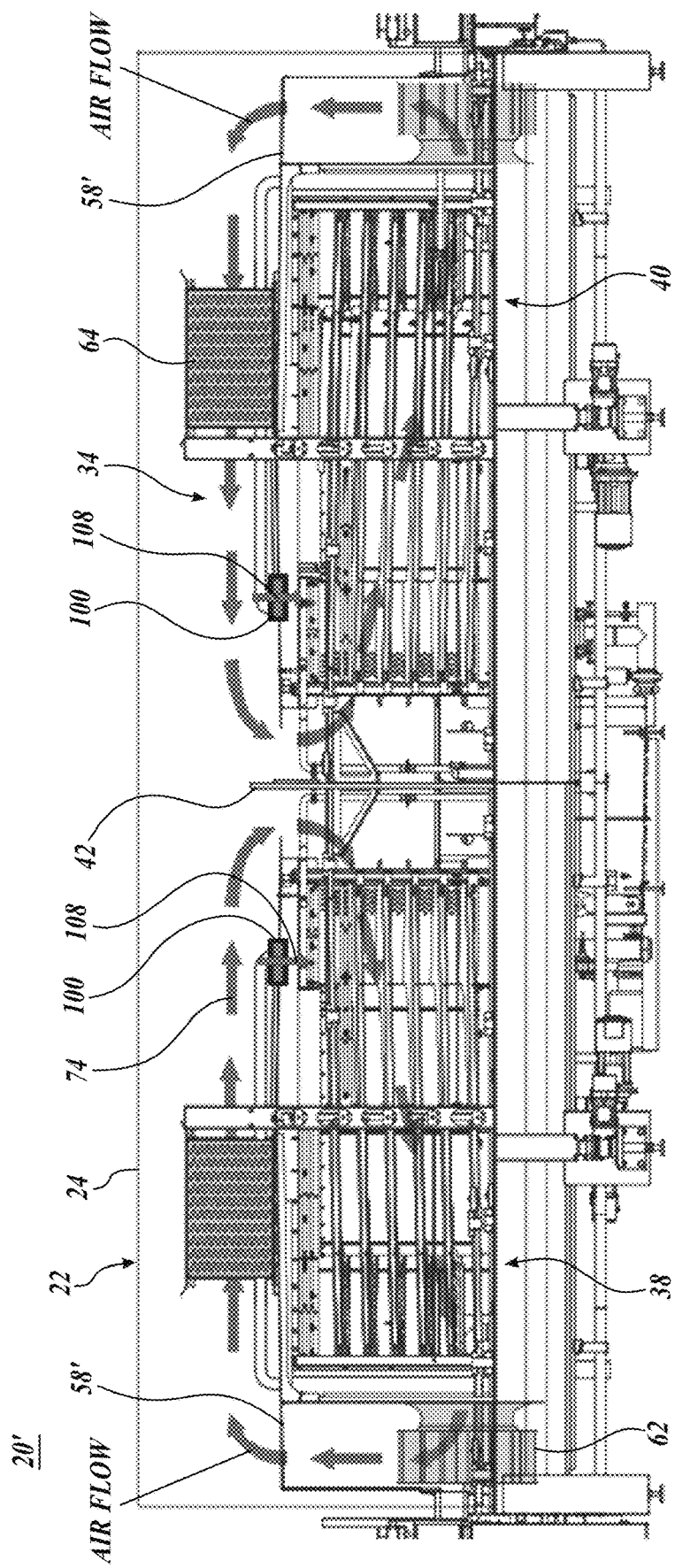
FIG. 9 is a cross-sectional view showing the spiral stack of FIGS. 6-8 arranged in a dual stack system.

As a non-limiting example, the size of the openings 100 can be selected so that the percentage of the flow of the processing medium downwardly through the openings 100 may be set at from 10% to 50% of the overall flow. As a further example, the size of the openings 100 can be adjusted so that the flow of the processing fluid passing downwardly through the openings may be set at about 20% to 50% of the overall flow of the processing medium. As a further example, the size of the openings 100 can be set so that the percentage of the processing medium flowing downwardly through the openings 100 may be from about 30% to 50% of the overall flow of the processing medium The openings 100 are positioned along an arc 110 generally corresponding to the curvature of the tiers constituting conveyor stacks 38 and 40. As shown in FIG. 8, the arc 110 is located along the inside edge of the annulus formed by the tiers of the conveyor stack 38. Nonetheless, the openings 100 can be positioned elsewhere across the width of the conveyor belt 36. Further, although a single row of openings 100 is illustrated in FIGS. 6-9, one or more additional rows of openings can also be located on the ceiling 58'.

FIGS. 10-13 illustrate a further embodiment of the present disclosure wherein apparatus 20" includes spiral conveyor systems 32" and 34", wherein the ceiling 58" over the spiral tiers 38 and 40 is constructed with an arcuate shape opening 200. Such opening 200 is located between the heat exchanger 64 and the curved edge 80 of the ceiling 56". The curvature of the opening 200 may correspond to the curvature of the conveyor stacks 38 and 40 over which the opening 200 is located, so that processing medium flowing from the heat exchanger 64 may be directed downwardly onto the stacks as desired, as shown by arrow 202, see FIG. 13.

Figure 12:
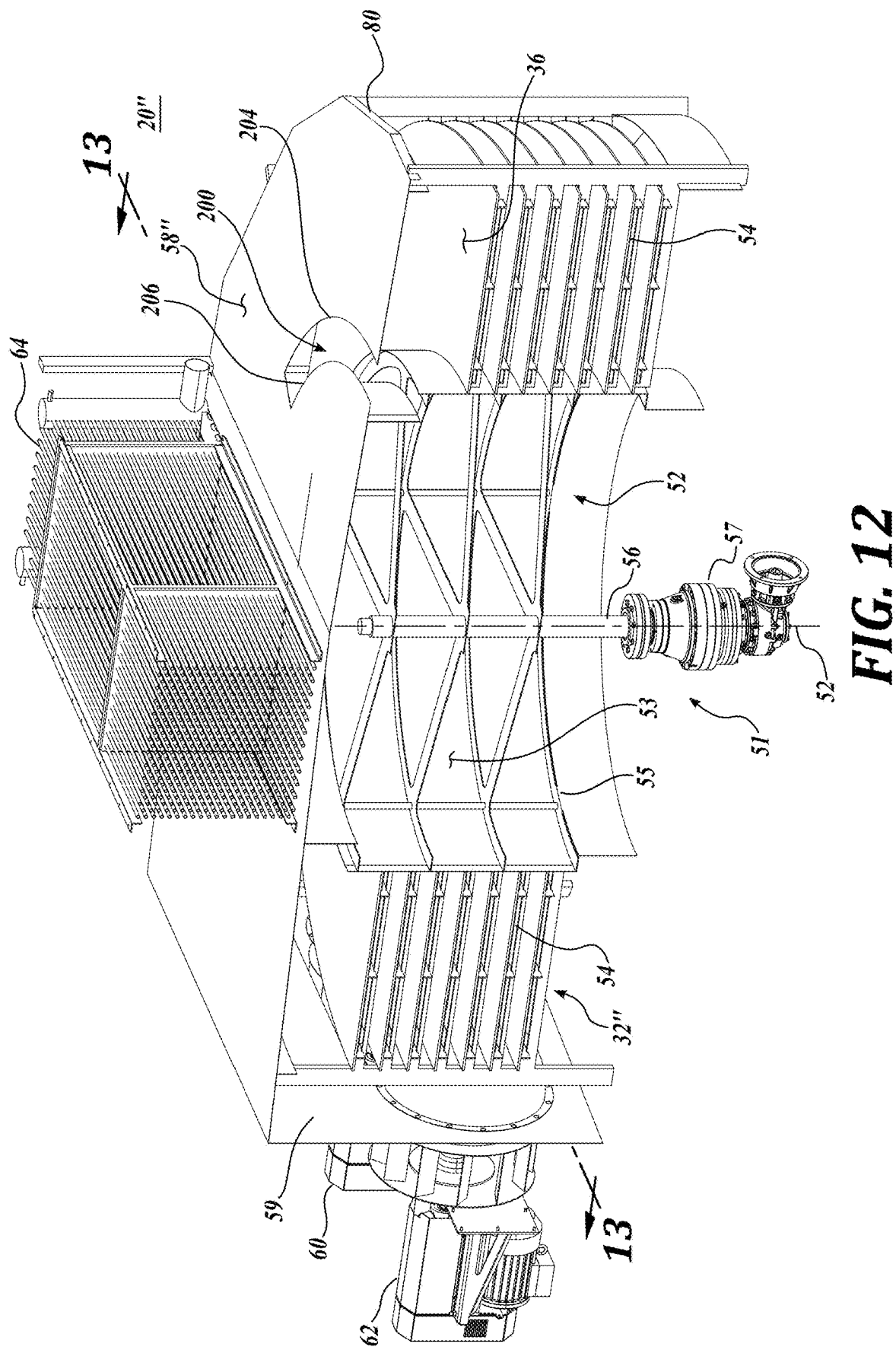
FIG. 12 is an isometric cross-sectional view of FIG. 11 taken along lines 12-12 thereof.
Figure 13:
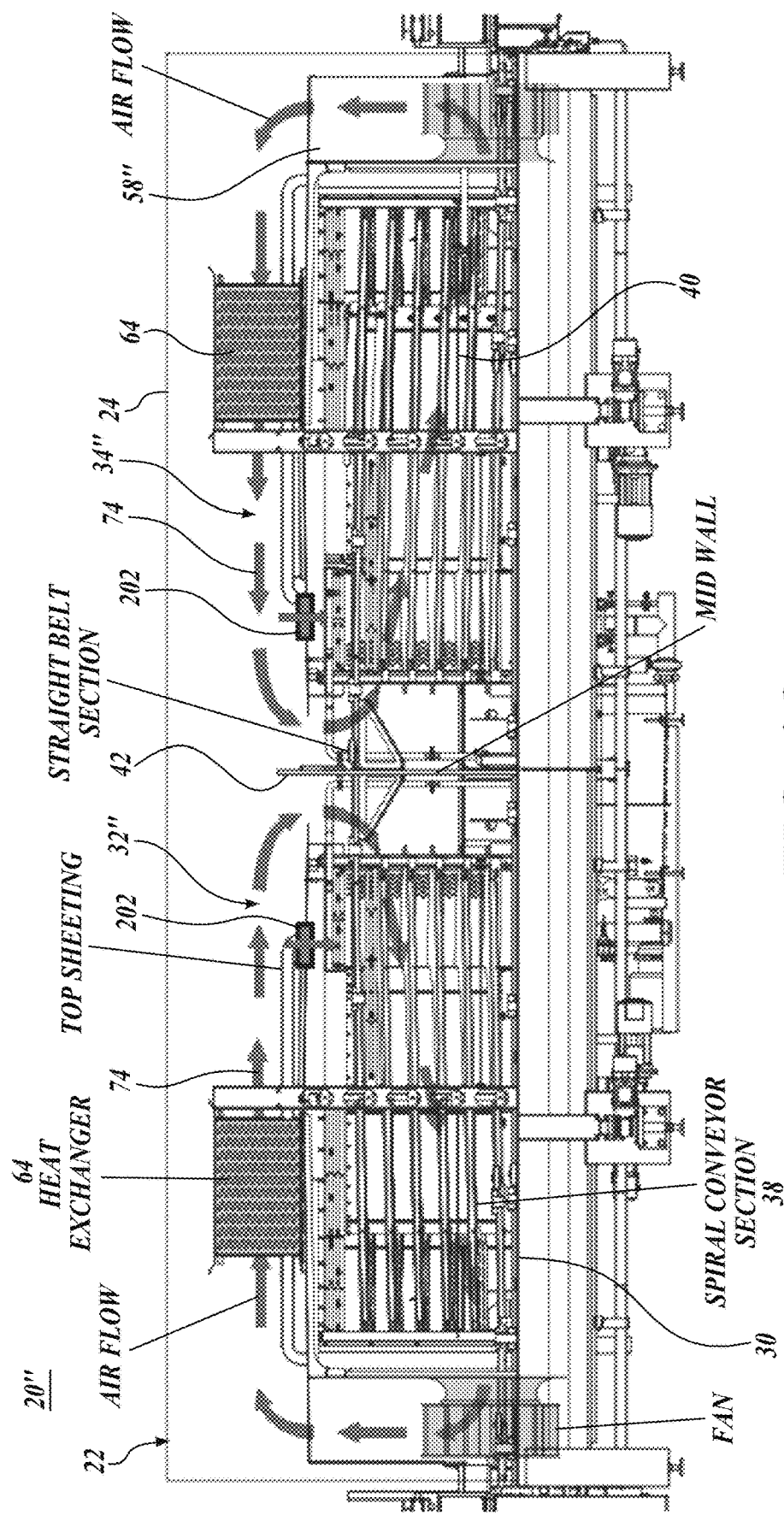
FIG. 13 is a cross-sectional view showing the spiral conveyor of FIGS. 10-12 disposed in a dual conveyor stack arrangement.

As shown in FIG. 12, the opening 200 is illustrated as located above the inside edge portion of the conveyor 36 so as to direct the processing medium at that portion of the width of the conveyor. However, the location of the opening 200 from the rotational center 52 of the conveyor units 32 and 34 may be selected to direct the processing fluid at a desired location across the width of the conveyor.

The width of the curved opening 200 is shown as substantially uniform along the length of the opening. However, the width of the opening can vary along the curvature of the opening so as to alter the amount of processing medium that passes downwardly through the opening and toward the tiers 38 and 40 located thereunder. Also, although not shown, a rim or baffle can extend upwardly from the ceiling 58" along the edge 204 of the opening 200 thereby to help divert processing medium downwardly through the opening 200. Also, if desired, the portion of the ceiling extending along the interior edge 206 of the opening 200 may be depressed downwardly so as to facilitate the flow of processing medium through the opening 200. As with the apparatus 20 and 20' illustrated and described above, in the apparatus 20" the opening 200 in the ceiling 68" diverts some of the processing medium exiting the heat exchanger 64 downwardly onto the spiral stacks 38 and 40. This results in a more uniform treatment of the work product located across the width of the conveyor belt 36. This is especially helpful with conveyor belts of increased widths.

The area defined by the arcuate opening 200 may be from about 2% to about 7% of the area defined by the spiral stacks 38 and 40 when looking downwardly thereon. The opening 200, while constituting about 3.5% of the circular area defined by the stacks 38 and 40, from about 17% of the processing fluid utilized in the system 20" flows downwardly through the opening 200 to reach the conveyor stacks 38 and 40 located there beneath.

Figure 10:
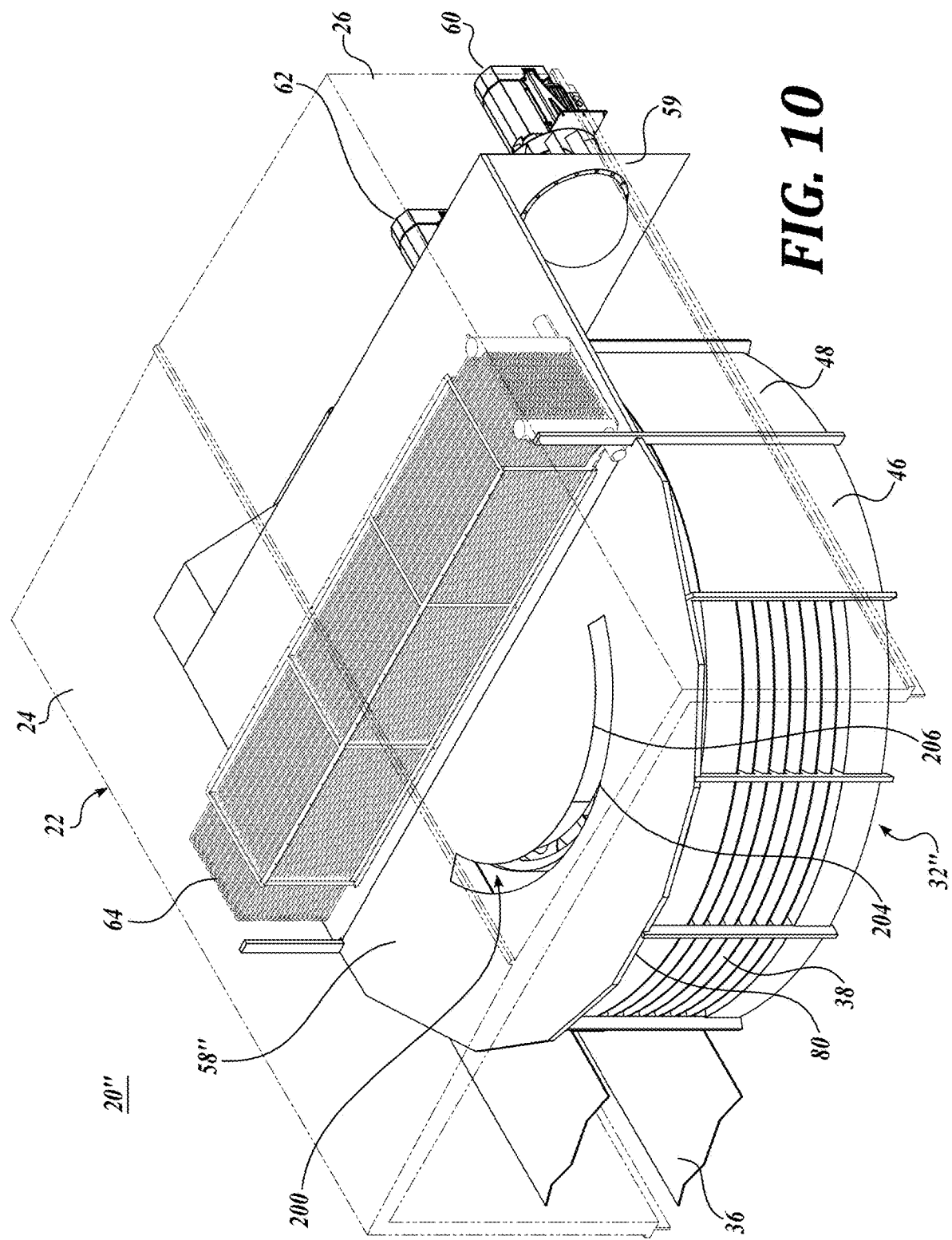
FIG. 10 is an isometric view of a further embodiment of the present disclosure.
Figure 11:
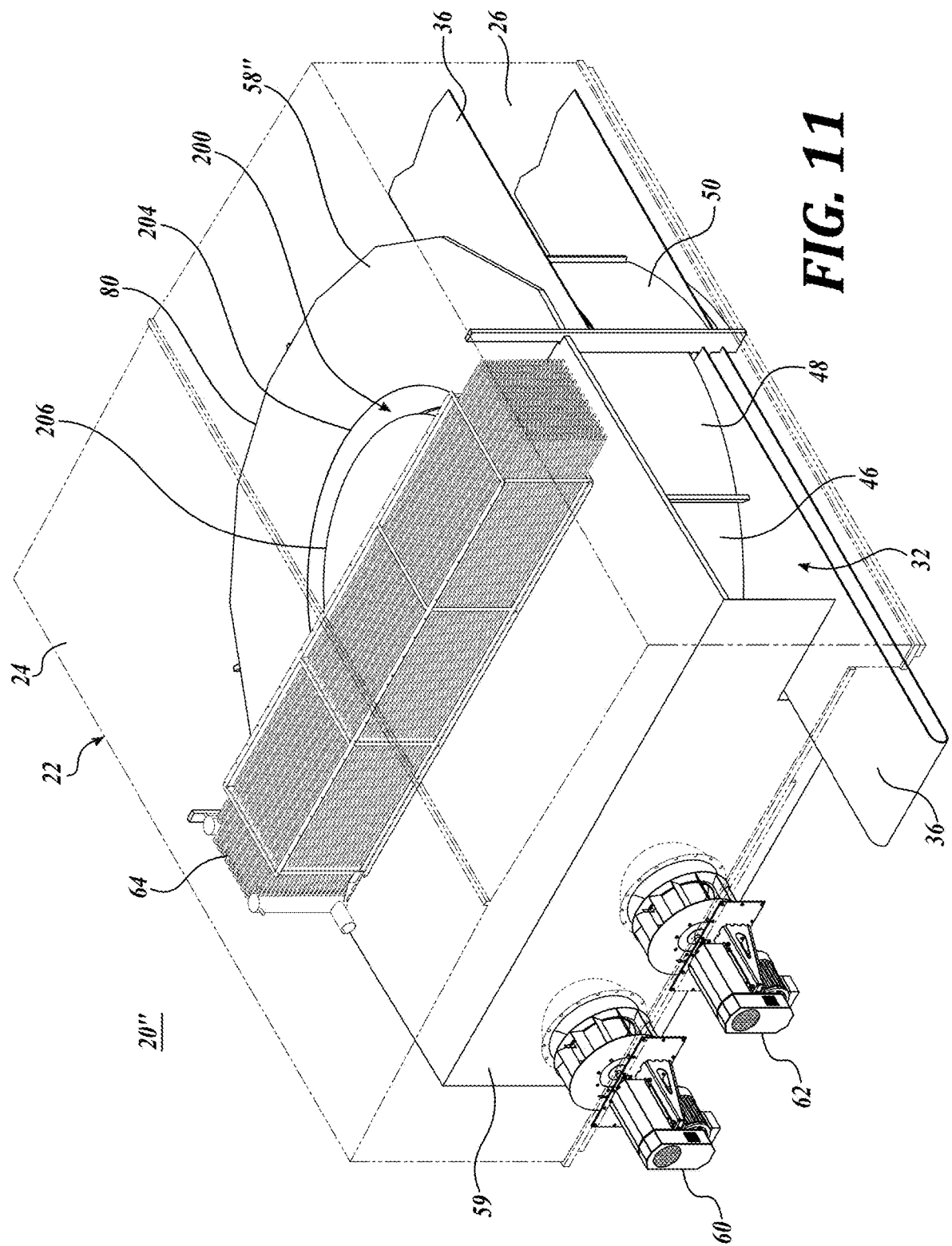
FIG. 11 is an isometric view of FIG. 10 taken from the opposite side.

As a non-limiting example, the size of the opening 200 can be selected so that the percentage of the flow of the processing medium downwardly through the opening 200 may be set at from 10% to 50% of the overall flow. As a further example, the size of the opening 200 can be adjusted so that the flow of the processing fluid passing downwardly through the opening may be set at about 20% to 50% of the overall flow of the processing medium. As a further example, the size of the opening 200 can be set so that the percentage of the processing medium flowing downwardly through the openings 200 may be from about 30% to 50% of the overall flow of the processing medium Although a single arcuate shaped opening 200 is illustrated in FIGS. 10-12, a plurality of arcuate shaped openings may be utilized, with the width, radius, and length of the opening chosen so as to achieve a desired level of processing medium flow downwardly through the plurality of openings. However, once the configuration of the one or more openings 200 has been selected, no further "adjustment" of the system 20" is required to achieve the desired processing characteristics for the system 20".

While illustrative embodiments have been illustrated and described, it will be appreciated that various changes can be made therein without departing from the spirit and scope of the invention. For example the opening(s) in the ceiling 58 can be of a shape or configuration other than as illustrated or described above. A positive attribute of the present invention is that once the size, shape, position, etc. of the opening(s) have been determined, there need be no changes made thereto. This results in a reliable and consistent thermal medium flow system.

The embodiments of the invention in which an exclusive property or privilege is claimed are defined as follows:

1. A thermal processing apparatus, comprising:
   (a) a powered conveyor belt for supporting work products during thermal processing, the conveyor belt moving along a spiral path arranged as a tiered stack;
   (b) a top sheeting disposed over the conveyor belt stack;
   (c) a circulation system to collect gaseous thermal processing medium from the tiers of the spiral conveyor belt stack and direct the thermal processing medium along an upward flow path located outward of the tiered stack to an elevation above the top sheeting and then across the top sheeting and then along a downward flow path along the exterior of the tiered stack at a location across the belt stack from the upward flow path of the thermal processing medium to enter the tiers of the tiered stack; and (d) the top sheeting defining at least one opening of a fixed size and location positioned above the spiral path of the spiral conveyor belt to provide an alternative flow route for a portion of the thermal processing medium flowing across the top sheeting to downwardly enter the spiral path of the conveyor belt at an alternative location across from the upward flow path of the thermal processing medium, and closer to the upward flow path of the thermal processing medium than the location of the downward flow path of the thermal processing medium along the exterior of the tiered stack.

2. The thermal processing apparatus of claim 1, wherein the percentage of thermal processing medium flowing through the at least one opening in the top sheeting is in the range of 10% to 50% of the total flow of the gaseous thermal processing medium.

3. The thermal processing apparatus of claim 1, wherein the flow of the thermal processing medium through the at least one opening in the top sheeting is from 20% to 50% of the total flow of the thermal processing medium.

4. The thermal processing apparatus according to claim 1, wherein the flow of the thermal processing medium through the at least one opening in the top sheeting is from 30% to 50% of the total flow of the thermal processing medium.

5. The thermal processing apparatus of claim 1, wherein a plurality of openings of fixed size and position are formed in the top sheeting above the spiral path of the conveyor belt stack.

6. The thermal processing apparatus of claim 1, wherein a portion of the top sheeting above the spiral path of the conveyor belt is removed to provide a portion of the thermal processing medium access to the spiral path of the conveyor belt stack.

7. The thermal processing apparatus according to claim 1, wherein an arcuate opening of fixed size and position is formed in the top sheeting above the spiral path of the conveyor belt with the curvature of the arcuate opening corresponding to the curvature of the spiral conveyor belt.

8. The thermal processing apparatus of claim 1, further comprising a heat exchanger for transferring thermal energy from or to the thermal processing medium.

9. The thermal processing apparatus of claim 8, wherein the heat exchanger is positioned above the top sheeting within the flow path of the thermal processing medium.

10. A thermal processing apparatus, comprising:
(a) a housing;
(b) a conveyor belt arranged in two spiral interconnected stacks positioned side by side to each other within the housing, in each stack the spiral conveyor belt defining a tiered annular travel path for the conveyor belt for supporting work products during thermal processing;
(c) an upright partition wall positioned between the two spiral stacks of the conveyor belt;
(d) a top sheeting disposed over the two spiral stacks of the conveyor belt;
(e) a circulation system positioned in the housing with respect to each spiral conveyor stack at locations spaced away from the partition wall, to draw spent gaseous thermal processing medium from the tiers of the spiral stacks and direct the thermal processing medium along upward flow paths disposed outward of the spiral stacks to an elevation above the top sheeting and then across the top sheeting toward a center partition wall and then downwardly along a flow path exterior of the spiral stacks and adjacent the partition wall to laterally enter the tiers of the spiral stacks; and
(f) the top sheeting for each of the spiral conveyor stacks defining at least one opening of a fixed size and location disposed above the spiral path of the spiral conveyor belt adjacent the partition wall to provide an alternative flow route for a portion of the thermal processing medium downwardly into annular paths of the conveyor belt stacks.

11. The thermal processing apparatus of claim 10, wherein the percentage of the total flow of thermal processing medium through the at least one opening in the top sheeting ranges from 10% to 50% of the total flow of the thermal processing medium flowing across the top sheeting.

12. The thermal processing apparatus of claim 10, wherein the percentage of the thermal processing medium flowing through the at least one opening in the top sheeting ranges from 20% to 50% of the total flow of the thermal processing medium flowing across the top sheeting.

13. The apparatus of claim 10, wherein the percentage of the thermal processing medium flowing through the at least one opening in the top sheeting ranges from 30% to 50% of the total flow of the thermal processing medium flowing across the top sheeting.

14. The apparatus of claim 10, comprising a plurality of openings of fixed size and locations formed in the top sheeting of the two spiral conveyor stacks.

15. The apparatus of claim 10, wherein a portion of the top sheeting adjacent the partition wall and above the spiral paths of the spiral conveyor belt being removed to provide a portion of the thermal processing medium an access path to enter the spiral conveyor belt path from above the spiral stacks and thereby to thermally treat the work products being carried on the spiral conveyor belt.

16. The thermal processing apparatus according to claim 10, wherein an arcuate opening is formed in the top sheeting with respect to each of the two spiral conveyor stacks to provide an access path for the thermal processing medium to enter the spiral conveyor belt path from above the spiral stacks and thereby to thermally treat the work products being carried on the conveyor belt.

17. The thermal processing apparatus according to claim 16, wherein the curvature of the arcuate opening corresponds to the curvature of the spiral conveyor belt path located beneath the arcuate opening formed in the top sheeting.

18. The thermal processing apparatus of claim 10, further comprising a heat exchanger to add heat to or extract heat from the thermal processing medium.

19. The thermal processing apparatus of claim 18, wherein the heat exchanger is positioned above the top sheeting within the flow path of the thermal processing medium.

* * * * *